Aug. 22, 1950   A. J. BOUTIN   2,519,735
SAW SHARPENING MACHINE
Filed Aug. 20, 1948   9 Sheets-Sheet 1

Arthur J. Boutin
INVENTOR.

BY Clarence A. O'Brien
and Harvey B. Jacobson
Attorneys

Arthur J. Boutin
INVENTOR.

BY Clarence A. O'Brien
and Harvey B. Jacobson
Attorneys

Arthur J. Boutin
INVENTOR.

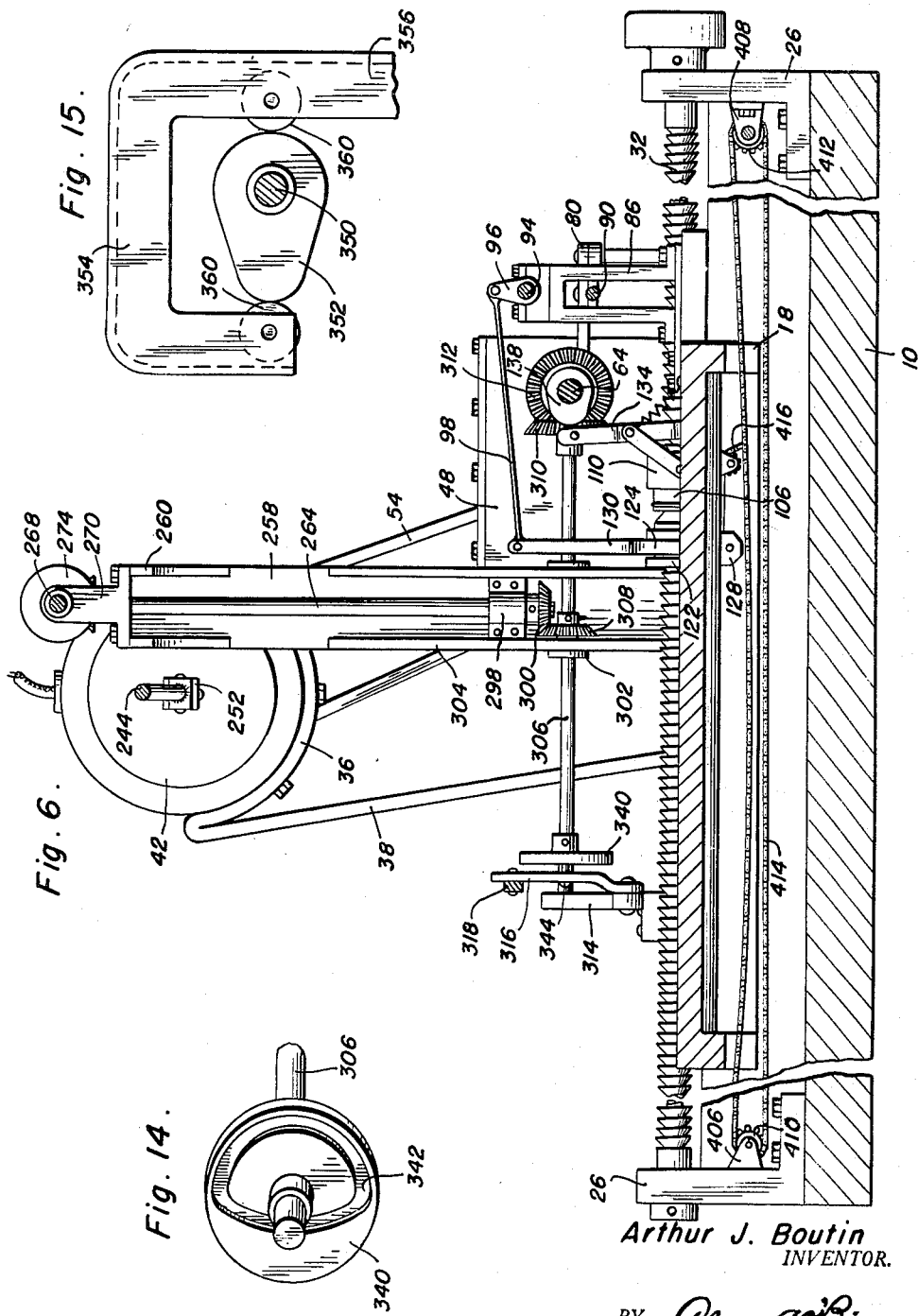

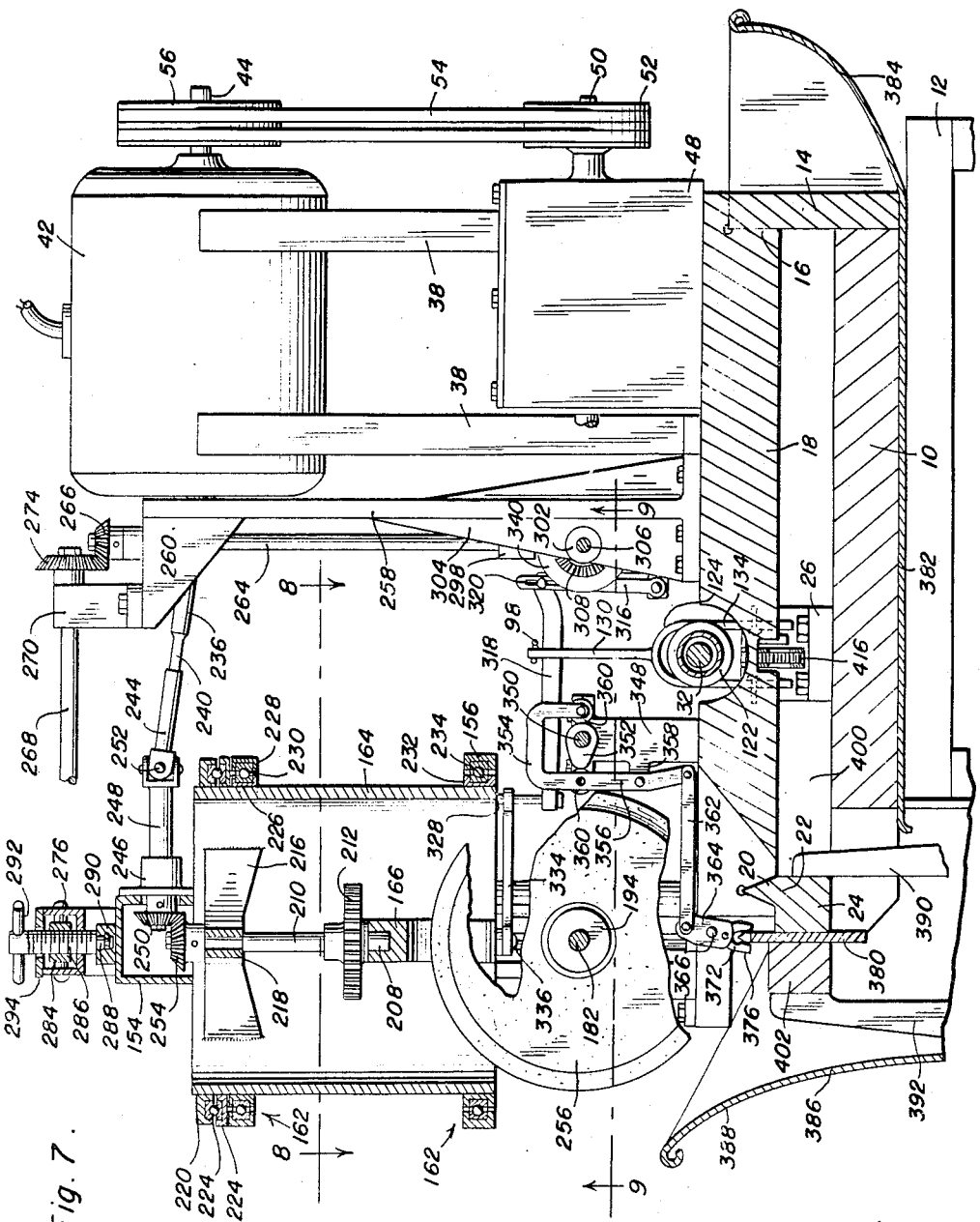

Aug. 22, 1950　　　A. J. BOUTIN　　　2,519,735
SAW SHARPENING MACHINE

Filed Aug. 20, 1948　　　9 Sheets-Sheet 8

Arthur J. Boutin
INVENTOR.

BY
*Clarence A. O'Brien
and Harvey B. Jacobson*
Attorneys

Aug. 22, 1950 A. J. BOUTIN 2,519,735
SAW SHARPENING MACHINE
Filed Aug. 20, 1948 9 Sheets-Sheet 9

Arthur J. Boutin
INVENTOR.

Patented Aug. 22, 1950

2,519,735

UNITED STATES PATENT OFFICE 2,519,735

SAW SHARPENING MACHINE

Arthur J. Boutin, Detroit, Mich.

Application August 20, 1948, Serial No. 45,300

16 Claims. (Cl. 76—41)

This invention relates to new and useful improvements in saw sharpeners and the primary object of the present invention is to provide a machine for sharpening the successive teeth of a saw and including means for sharpening the bevel on opposite sides of the teeth of the saw, such as the longitudinally spaced teeth of a hand saw.

Another important object of the present invention is to provide a saw sharpening machine including a longitudinally movable carriage and embodying novel and improved means for advancing the carriage in a step by step movement by either a source of power in which instance the carriage will travel at a predetermined rate of speed or by manual means when the teeth of a saw are to be sharpened selective amounts.

Another object of the present invention is to provide a machine for cutting or sharpening saw teeth including a longitudinally movable carriage, a reciprocating and oscillating support movable with the carriage, and a grinding wheel or tool carried by the support to oppositely bevel the edges of adjacent saw teeth.

Another object of the present invention is to provide a saw sharpening machine including a longitudinally movable carriage that is advanced in a step by step movement relative to a saw to present the successive teeth of a saw to the action of a rotary abrasive member or cutter and novel and improved cutter supporting means that is reciprocated and oscillated for cutting or sharpening the teeth of a saw at a predetermined angle.

Another feature of the present invention is to provide a machine applicable for cutting teeth in metal to form a saw blade and for sharpening the bevel on opposite sides of the teeth of a saw that embodies a novel and improved saw setting mechanism that will consecutively and oppositely bend or set the teeth of a saw a uniform, predetermined amount.

Another feature of the present invention is to provide a saw sharpening machine including a longitudinally movable carriage supporting an abrasive wheel, a novel and improved operating mechanism for advancing the carriage in a step by step movement, and a braking and releasing mechanism for manually stopping the carriage or for re-setting the carriage at a selected point during the travel thereof.

Another object of the present invention is to provide a saw sharpening machine including power operating means for advancing a cutter supporting carriage for successively sharpening the teeth of a saw, a cutter support that is reciprocated and oscillated, and a clutch mechanism that is manually operable to brake or stop the movement of the carriage without effecting the action or movement of the cutter support, thereby permitting selected teeth of a saw to be sharpened with greater finesse or precision than the remaining teeth.

A further object of the present invention is to provide a saw sharpening machine having a carriage actuating mechanism, and a cutter or abrasive wheel reciprocating and oscillating mechanism that is synchronized with the carriage actuating mechanism whereby the bevel on opposite sides of the teeth of a saw will be sharpened.

A still further aim of the present invention is to provide a saw sharpening and saw tooth setting machine that is simple and practical in construction, strong and reliable in use, small and compact in structure, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 6 is a fragmentary longitudinal vertical sectional view taken susbtantially on the plane of section line 6—6 of Figure 3;

Figure 7 is an enlarged transverse vertical sectional view taken substantially on the plane of broken section line 7—7 of Figure 1;

Figure 14 is a fragmentary perspective view of the cam wheel that is employed in conjunction with the present invention for oscillating the cutter support;

Figure 15 is an enlarged fragmentary elevational view illustrating the saw set actuating mechanism; and, Figure 16 is a perspective view of the saw teeth setting member and showing the same applied to a hand saw.

Figure 1:
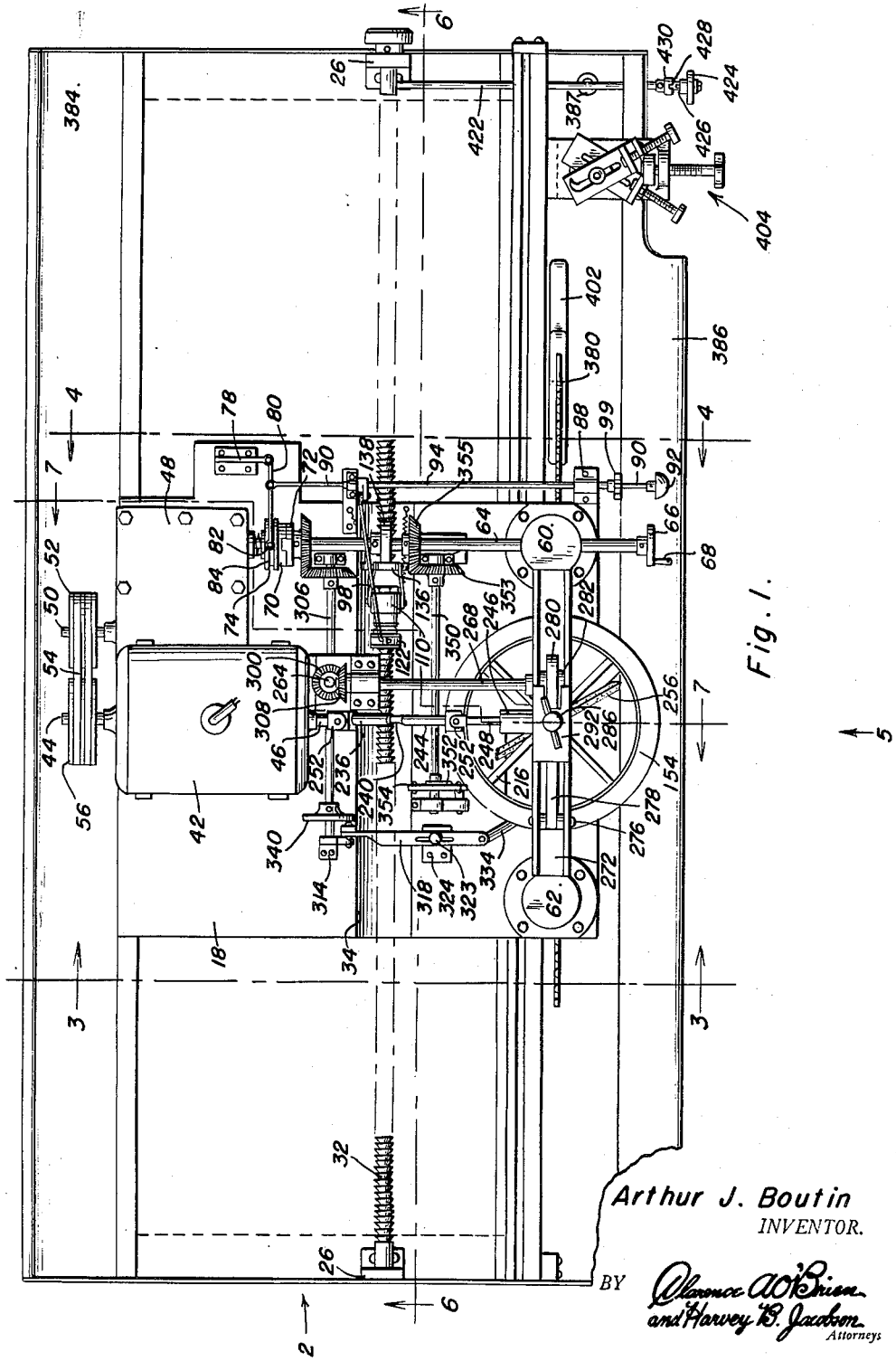
Figure 1 is a top plan view of the saw sharpening machine constructed in accordance with the present invention.
Figure 8:
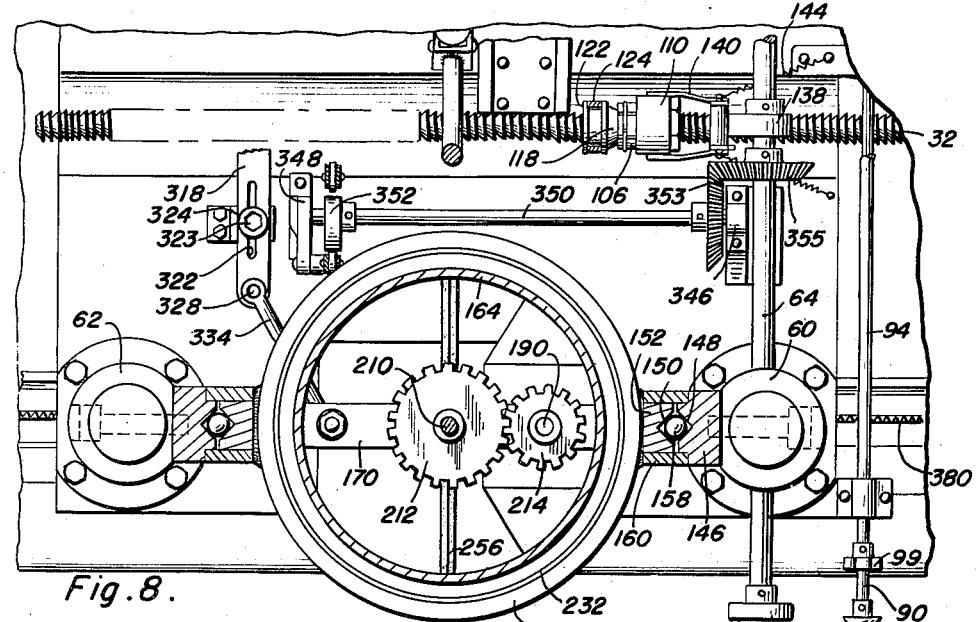
Figure 8 is a fragmentary, horizontal, longitudinal sectional view taken substantially on the plane of section line 8—8 of Figure 7.

Numeral 10 represents a substantially rectangular base plate that is supported in an elevated, substantially horizontal position by a suitable stand or table 12.

Fixed to rear longitudinal edge of the base plate 10, is an upstanding rear guide panel 14 the upper portion of which engages a longitudinal recess or notch 16 that is provided in the rear portion and underside of a longitudinal movable or slidable carriage 18. The forward portion of the carriage 18 is also provided with a longitudinally extending, substantially V-shaped groove or recess 20 in its lower surface that slidably receives an upstanding substantially V-shaped forward guide strip 22 which is integrally formed with the upper face of a longitudinal strip or beam 24 that is suitably fixed to the upper surface of the base plate 10 adjacent the forward longitudinal edge thereof.

Figure 4:
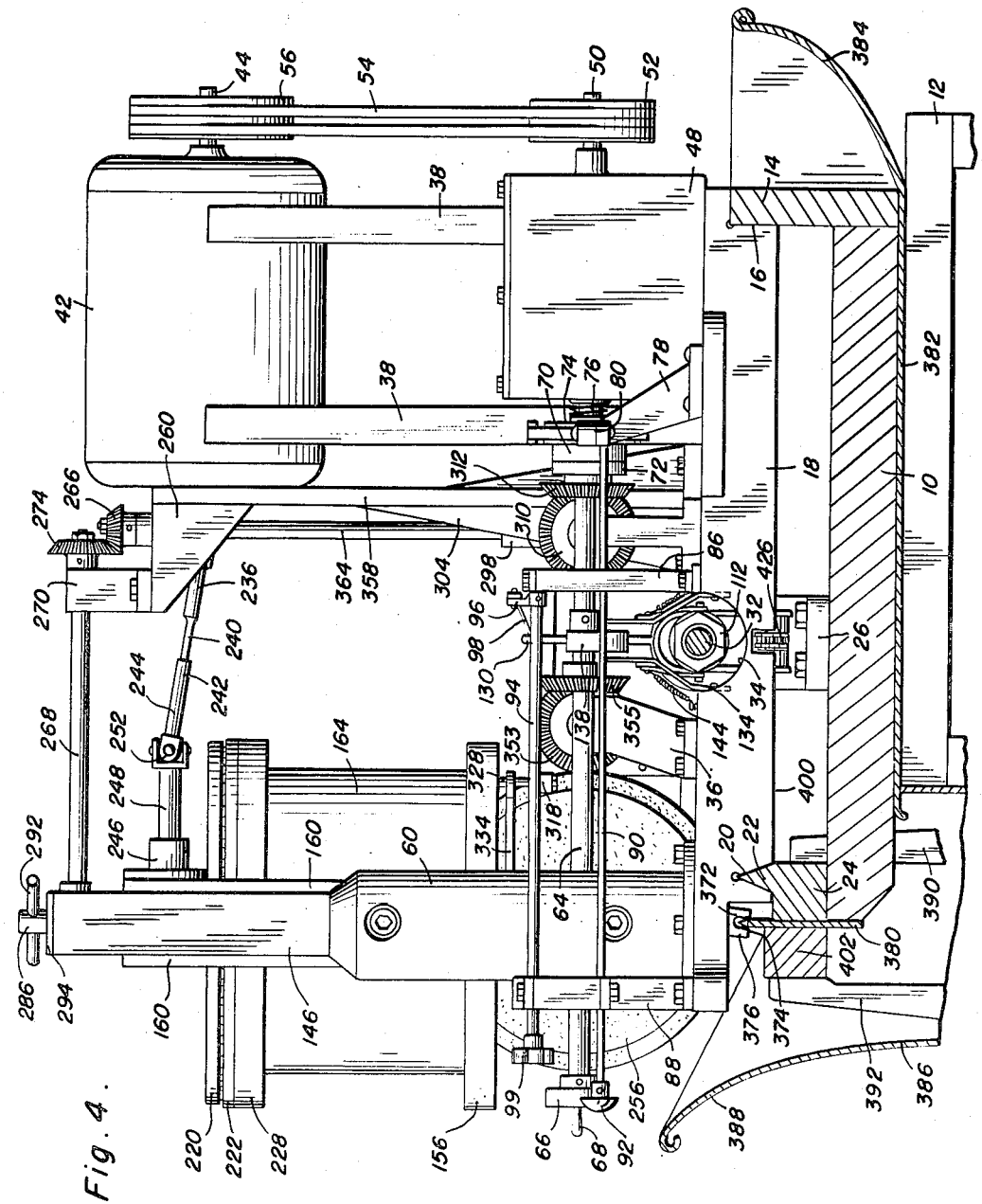
Figure 4 is an enlarged, fragmentary, transverse vertical sectional view taken substantially on the plane of section line 4—4 of Figure 1.

A pair of angle members 26 are removably secured to the upper surface of the base plate 10 adjacent the transverse edges thereof, and the upstanding or vertically disposed legs of these angle members 26 are apertured to receive the reduced portions 30 of a longitudinally disposed stationary rack bar or annularly toothed cylinder 32 which is positioned above the base plate 10 and which loosely engages a longitudinal recess or channel 34 formed in the upper surface of the carriage 18 intermediate the forward and rear portions of the same, as shown best in Figures 1, 4 and 7 of the drawings.

Motor mounting

Supported by the concaved or downwardly arcuated web portions 36 of a plurality of substantially U-shaped frames or straps 38 having outwardly turned end portions 40 which are bolted to the carriage 18, is a preferably electric motor 42 that includes a drive shaft the terminals of which project outwardly therefrom and are indicated by the numerals 44 and 46.

A gear housing 48 is suitably mounted on the carriage 18 at the rear portion thereof, adjacent and to one side of the motor 42 and includes an outwardly projecting rear shaft 50 that supports a suitable pulley 52 that is connected by a belt or belts 54 to a pulley 56 mounted on the rear terminal 44 of the motor's drive shaft.

A journal shaft 58 also projects outwardly from the housing 48 and is operatively connected through the medium of any suitable, well known and conventional reduction gearing (not shown) to the shaft 50 whereby the shaft 58 will be rotated at a speed less than the speed at which the drive shaft of the motor 42 is being rotated.

Carriage actuating mechanism

Removably secured to the forward portion of the carriage 18 are the flanged portions of a pair of longitudinally spaced, upstanding posts 60 and 62, one of which for example post 60, rotatably supports a main drive shaft 64 the forward terminal of which is provided with a finger grip or wheel 66 having a projecting lug 68 for manual rotation of the shaft 64.

A first clutch plate 70 is suitably mounted on the main drive shaft 64 and normally engages a complementary clutch plate 72 slidably keyed to and rotatable with the forward shaft 58 of the gear housing 48. A collar 74 is rotatable with and slidable on the shaft 58, and is urged by a coil spring 76 embracing the shaft 58 against the clutch plate 72 to normally engage the clutch plate 72 with the clutch plate 70.

An upstanding bracket 78 is secured to the carriage 18 and pivotally supports one end of a link 80, the free end of which supports a pin 82 that engages an annular groove 84 provided in the collar 74, see Figure 1.

Slidably supported by a pair of transversely spaced guide brackets 86 and 88 that are secured to the carriage 18, is an operating rod 90 that is pivoted to the link 80. This rod is provided at its forward terminal with a finger grip 92 that is pushed inwardly to actuate the link 80 and thereby disengage the clutch plate 70 with the clutch plate 72 to prevent rotation of the drive shaft 64.

The brackets 86 and 88 rotatably support a shaft or bar 94 that is spaced parallel to the rod 90 and which supports a laterally projecting arm 96 that is pivoted to one end of a downwardly inclined push rod 98. A hand grip 99 is mounted on the bar 94 for actuating the same.

Embracing the rack bar 32 is an expandible and contractible, resilient sleeve 100 having a plurality of circumferentially spaced, longitudinal slits 102 that will permit the said sleeve to be expanded in a manner presently to be described. An annular groove 104 is provided in the enlarged head or end portion 106 of the sleeve 100 and receives a split, annular spring 107 that normally retains a plurality of annular teeth 108 on the inner surface of the head portion 106, complementary to the teeth on the rack bar 32, engaged with the teeth of the rack bar 32, as shown best in Figure 10 of the drawings.

A collar or ring 110 embraces the sleeve 100, bears against the head portion 106 of the sleeve 100, and a bearing surface 111 of the carriage, and is removably secured on the sleeve 100 by a lock nut 112 that receivably engages the externally threaded end portion 114 of the said sleeve 100.

Loosely embracing the rack bar 32, is a cylinder 116 having a tapered end portion 118 that is engageable with the inwardly tapered inner surface 120 of the head portion 106, in a wedgelike manner, to spread or expand the sleeve 100 whereby the toothed inner surface of the head portion or teeth 108 will disengage the teeth of the rack bar 32 and the carriage 18 may be moved manually in a longitudinal direction.

Figure 10:
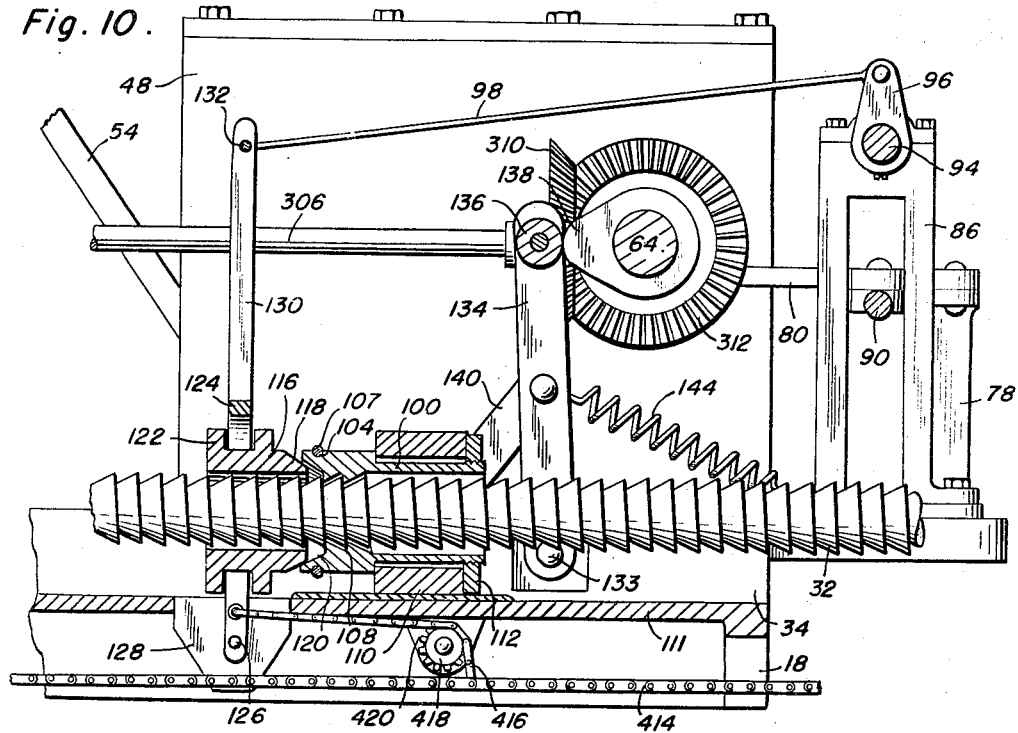
Figure 10 is an enlarged detail sectional view illustrating the means for advancing the carriage relative to the stationary bar, and the release means therefor.

The cylinder 116 is provided with a pair of spaced, annular ribs 122 between which there is engaged the spaced leg portions of a yoke 124, the ends of which are pivoted as at 126 to ears 128 that depend from the carriage 18, see Figure 10.

Fixed to and projecting upwardly from the web portion of the yoke 124, is a lever or arm 130 that is pivoted to the free, angulated end 132 of the push rod 98. Extending into and pivotally secured to the inner walls of the longitudinal recess 34, as at 133, are the off-set end portions of a pair of upstanding arms 134 that are connected at their upper terminals by a roller or bearing element 136 which is engageable with a substantially heart shaped cam 138 that is removably secured on the main drive shaft 64, see Figure 10.

Figure 11:
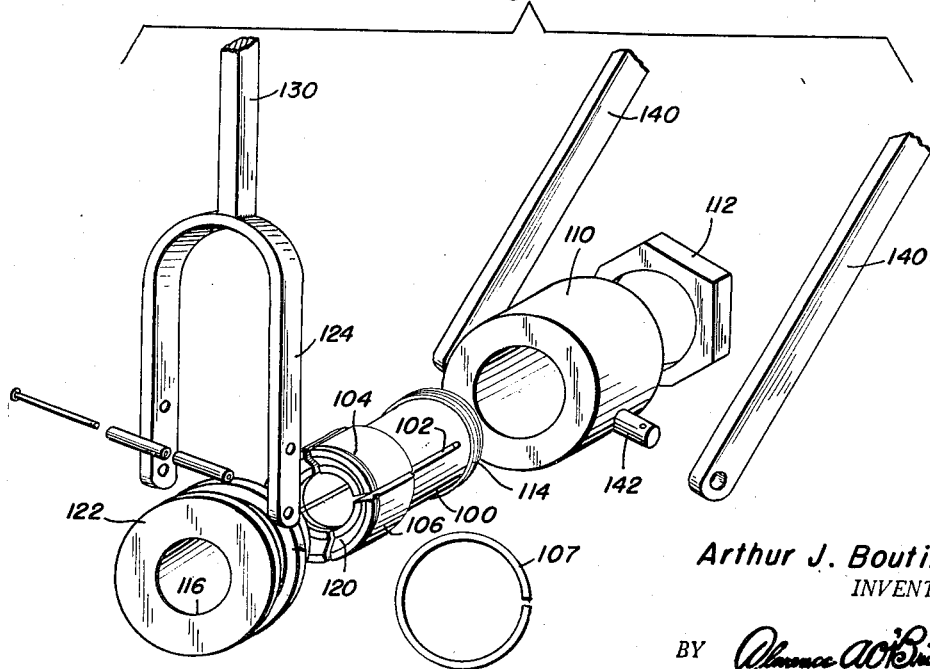
Figure 11 is a group perspective view showing the elements employed for advancing the carriage in a step by step movement on the rack bar and for releasing the carriage moving mechanism.

Pivoted to the arms 134, is a pair of connecting links 140 the free eye ends of which are pivotally and removably secured to lugs 142 that project outwardly from diametrically opposite sides of the collar 110, see Figure 11.

Resilient members or coil springs 144 are anchored to the carriage 18 and the links 140 to normally urge the arms 134 upwardly and the roller 136 against the cam 138.

When the apex of the cam 138 engages the roller 136, during rotation of the main drive shaft 64, the arms 134 will pivot, against action of the springs 144, and the links 140, collar 110 and sleeve 100 will move on the rack bar 32 the distance of one tooth thereof each time the apex of the cam 138 engages the roller 136 upon the upward swing of the arms 134 due to the springs 144. This is best illustrated in Figure 10 of the drawings wherein the carriage 18 and sleeve 100 will move from left to right during the upward pivotal movement of the arms 140 which, as shown, are urged downwardly by the cam 138.

As the push rod 98 is actuated to the left, in Figure 10, the releaser or cylinder 116 will be forced to the right and the tapered end 118 thereof will engage the inwardly tapered surface 120 of the head portion 106 spreading or expanding the sleeve 100 and thus permitting the carriage 18 and sleeve 100 to be moved freely since the sleeve 100 is no longer locked on the rack bar 32.

*Cutter support*

Removably secured to the opposing surfaces of the posts 60 and 62, in any suitable manner, is a pair of spaced parallel, substantially vertical guide bars 146 having longitudinal V-shaped grooves 148 that oppose complemental V-shaped grooves 150 formed in the outer faces of a pair of guide bars or strips 152 which are fixed to the ends of an upper substantially channel shaped member 154 and a lower, annular channel shaped member 156.

Anti-friction elements or balls 158 are positioned in the grooves 148 and 150 or sockets formed in the grooves to permit the members 154 and 156 to be raised and lowered relative to the guide bars 146 in a convenient manner.

Retaining strips 160 are removably secured to the sides of the guide bars 152 and engage recesses provided in the side faces of the guide bars 146 to prevent other than vertical movement of the members 154 and 156 and to retain the bars 152 relative to the bars 146.

Supported relative to the bars 152 for vertical movement with the same and for rotary movement relative to the said bars 152, through the medium of a plurality of annular bearings indicated generally by the numeral 162, is a cylindrical casing or support 164, see Figure 7.

The numeral 166 represents a substantially U-shaped member that is disposed within the casing 164. One leg portion of the member 166 for example leg 168 is provided with a lateral projection 170 that is fixed by welding or the like to the inner periphery of the casing 164.

The remaining leg 172 of the member 166 is elongated, and terminates in an enlarged extension 174 having a groove in which there is fixed a semi-cylindrical bearing 176. A plate 178 is removably secured to the extension 174 and is formed with a groove that engages a semi-cylindrical bearing 180 that opposes the bearing 176 and which cooperates with the bearing 176 to rotatably support a cutter holding shaft 182, that is supported by a bearing 183 depending from one guide 152, see Figures 5 and 12.

Integrally formed with and projecting laterally from the leg 172 is a substantially horizontal arm 184 that is fixed to the casing and which is provided with a socket 186 intermediate its ends that receives a bearing sleeve 188 in which there is rotatably supported a shaft 190 the lower terminal of which removably carries a beveled gear 192 that engages and is meshed with a further beveled gear 194 mounted on the cutter holding shaft 196.

A further arm 198 is rigidly attached to or forms an integral part of the leg 172. This latest arm 198 is spaced above and parallel to the arm 184, and terminates in an enlarged extension 200 having a concaved outer face that engages a semi-cylindrical bearing sleeve 202.

A holding plate 204 is removably secured to the extension 200 and includes a recess in its inner face to which there is fixed a semi-cylindrical sleeve or journal bearing 206 that cooperates with sleeve 202 to embrace and rotatably support the shaft 190.

Rotatably positioned in a socket 208 formed in the web portion of the member 166, is the lower end of a shaft 210 on which there is removably secured an annular gear 212 that engages an annular gear 214 mounted on the upper terminal of the shaft 190.

Figure 5:
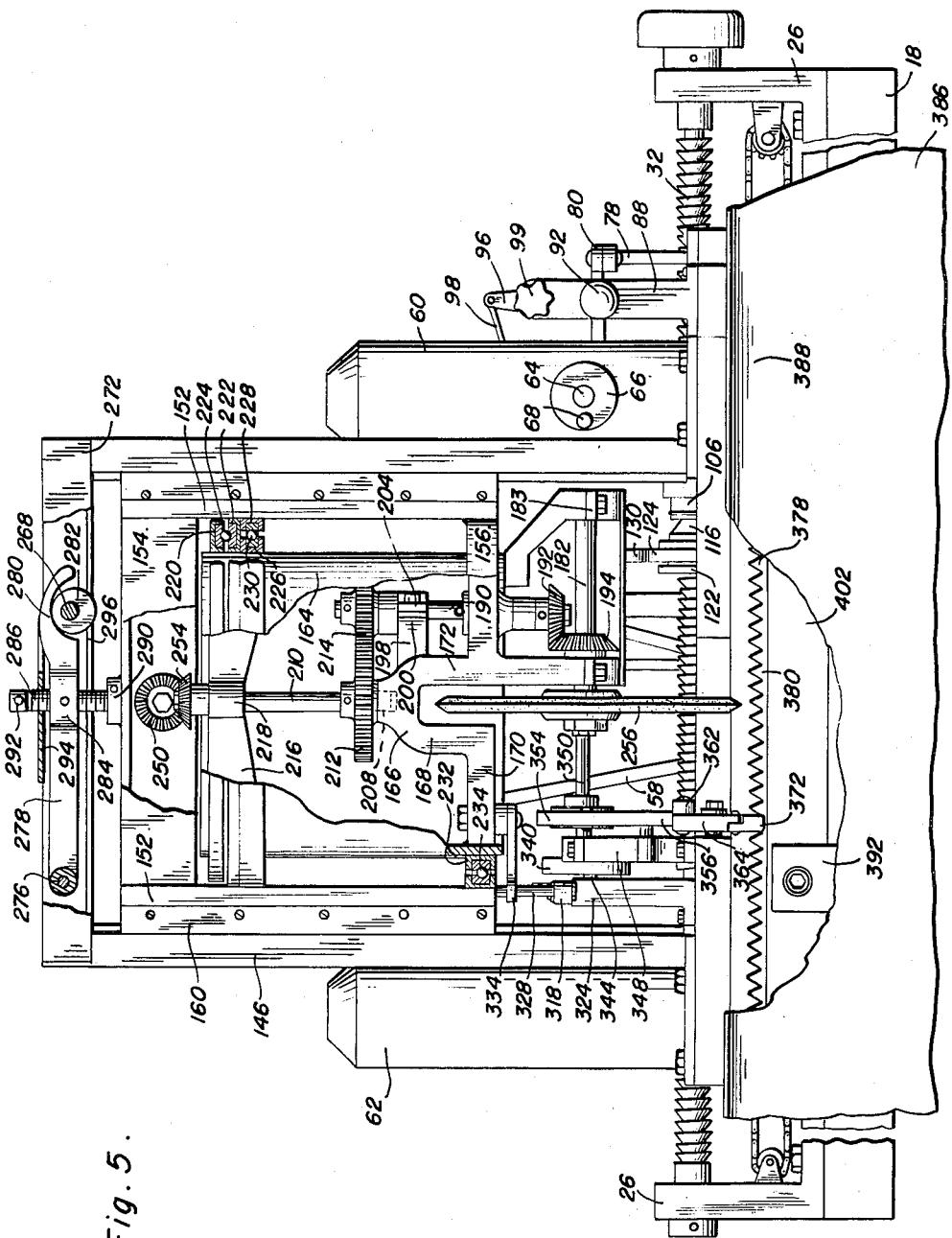
Figure 5 is an enlarged front elevational view of the present invention taken substantially in the direction of arrow numbered 5 in Figure 1 and with parts broke away for the convenience of explanation.

Fixed by welding or the like to the inner periphery of the casing 164 at the upper end thereof, are the radial arms or fins 216 of a spider 218, the central hub portion of which rotatably supports a reduced portion of the shaft 210, see Figure 5.

An upper annular channel member 220 is welded or otherwise fixed to the outer periphery of the casing 164 and opposes a further annular channel member 222 that is fixed to the strips 152. Suitable ball bearing races 224 are engaged in the channels 220 and 222 to permit the casing 164 to rotate or oscillate relative to the strips 152.

Also fixed to the outer periphery of the casing 164, beneath the channel 222, is the web portion of another annular channel member 226 that opposes a still further annular channel member 228 which is fixed to the strips 152 by welding or the like. Engaged in these latest channel members 226 and 228, is a further pair of companion ball races 230 that assume vertical thrust and aid in supporting the rotary or oscillatory motion of the casing 164.

The aforementioned channel member 156 opposes a further annular channel member 232 fixed to the outer periphery of the casing 164 at the lower end of the casing and these members 156 and 232 support annular ball races or bearings 234.

Cutter driving mechanism

A rotary shaft 236 is connected by an universal coupling or joint 238 to the terminal 46 of the motor 42 and the free squared terminal 240 of the shaft 236 slidably engages the substantially square socketed end 242 of another shaft 244.

Journaled for rotation in a bearing 246 carried by the upper channel member 154 is a driven shaft 248 one end of which is disposed in the channel member 154 and supports a beveled gear 250 while the remaining and outer end is coupled to the shaft 244 by a universal joint 252.

The beveled gear 250 engages a companion beveled gear 254 that is mounted on the upper terminal of the shaft 210 whereby the drive shaft of the motor 42 will rotate the shaft 248, the shaft 210, the shaft 190 and hence the shaft 182 on which there is mounted a suitable cutter blade, abrading wheel or tool 256 that loosely engages and rotates between the legs of the member 166.

Cutter raising and lowering mechanism

Removably secured to the carriage 18 is a supporting post 258 on which there is secured a platform 260 that holds a bearing 262 for a substantially vertical shaft 264 having a beveled gear 266 mounted on its upper terminal.

A substantially horizontal shaft 268 that is rotatably supported by a bearing 270 mounted on the platform 260 and a channeled cross member 272 that is fixed between the upper portions of the guide strips 146, and this latest shaft 268 retains a beveled gear 274 that engages the beveled gear 266.

Pivoted as at 276 between the sides of the cross member 272 is one end of a lever 278 having an arcuate end portion 280 that bears against a cam 282 which is mounted on the shaft 268.

Intermediate the ends of the lever 278 there is provided an internally threaded sleeve 284 that is pivoted to an externally threaded rod 286 the lower reduced end of which is swiveled as at 288 in a socket 290 fixed to the channel member 154.

A stop and hand grip 292 is fixed to the upper terminal of the rod 286 and limits the downward travel of the rod 286 the casing 164 and its associated parts including the cutter or tool 256.

A bearing plate 294 fixed to the channel 272 engages the stop 292 to limit the movement of the rod 286 and is formed with a longitudinal slot that will permit vertical movement of the arcuate portion 280.

The web portion of the member 272 is also provided with a longitudinal slot 296 that will permit rotation of cam 282 without the necessity of having to exercise the depth of the said channel member 272.

When the shaft 268 is in motion, the apex of the cam 282 will engage the finger or arcuate portion 280 of the lever 278 to pivot the lever 278 upwardly about its fulcrum 276 thus raising the rod 286 and the casing 164. As the apex of the cam 282 passes over the portion 280, the lever 278 will move to its normally lowered position together with the casing 164.

The lower terminal of the vertical shaft 264 is journaled for rotation in a bearing 298 mounted on the post 258 and supports a beveled gear 300.

A pair of opposed bearings 302 are secured to side walls 304 that project outwardly from the post 258 and rotatably receive a shaft 306 on which there is disposed a beveled gear 308 that engages the gear 300.

One terminal of the shaft 306 forms a support for a beveled gear 310 that engages the beveled gear 312 on the main drive shaft 64 and the remaining terminal of the shaft 306 is journaled in a bearing 314 that is mounted on the carriage 18, see Figure 6.

Cutter oscillating mechanism

Pivoted to the bearing 314, is an upstanding link 316 that is slidably connected to one terminal of a push link 318 as at 320. This push link 318 is provided with a longitudinal slot 322 that slidably engages a pin or bolt 323 projecting upwardly from a bearing block 324 which is mounted on the carriage 18.

Figures 12, 13:
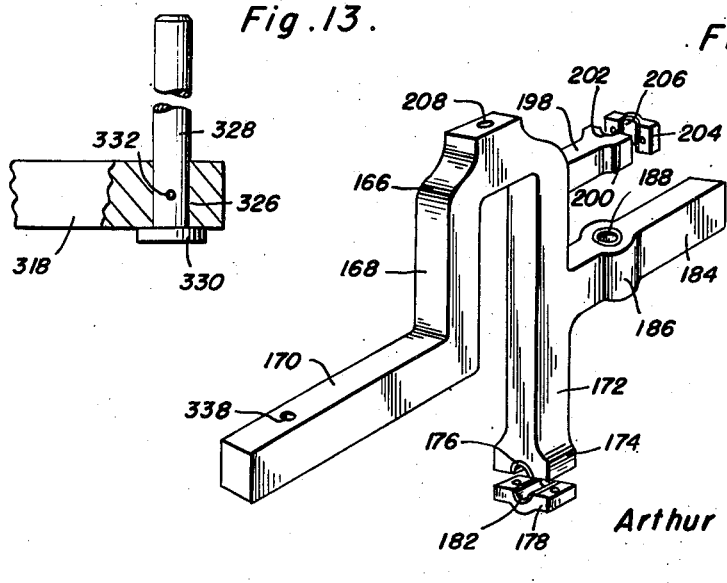
Figure 12 is a perspective view of the cutter or tool supporting element that is used in conjunction with the present invention.
Figure 13 is an enlarged fragmentary side elevational view of the reciprocating link that is associated with the cutter oscillating mechanism and illustrating the connecting pin employed therewith.

The free terminal of the link 318 is provided with an aperture 326 that receives the shank portion 328 of a headed pin 330, and this pin 330 is retained relative to the link 318 by a removable holding pin 332 that extends through the link 318 and the shank portion 328, see Figure 13.

One eye end of a connecting link 334 is removably secured to the laterally projecting arm 170 of the member 166 by a bolt 336 that receivably engages an internally threaded recess 338 provided in the arm 170, see Figure 12. The remaining eye end of the connecting link 334 pivotally secured to the shank portion 328 of the pin 332, see Figures 7 and 9.

Figure 9:
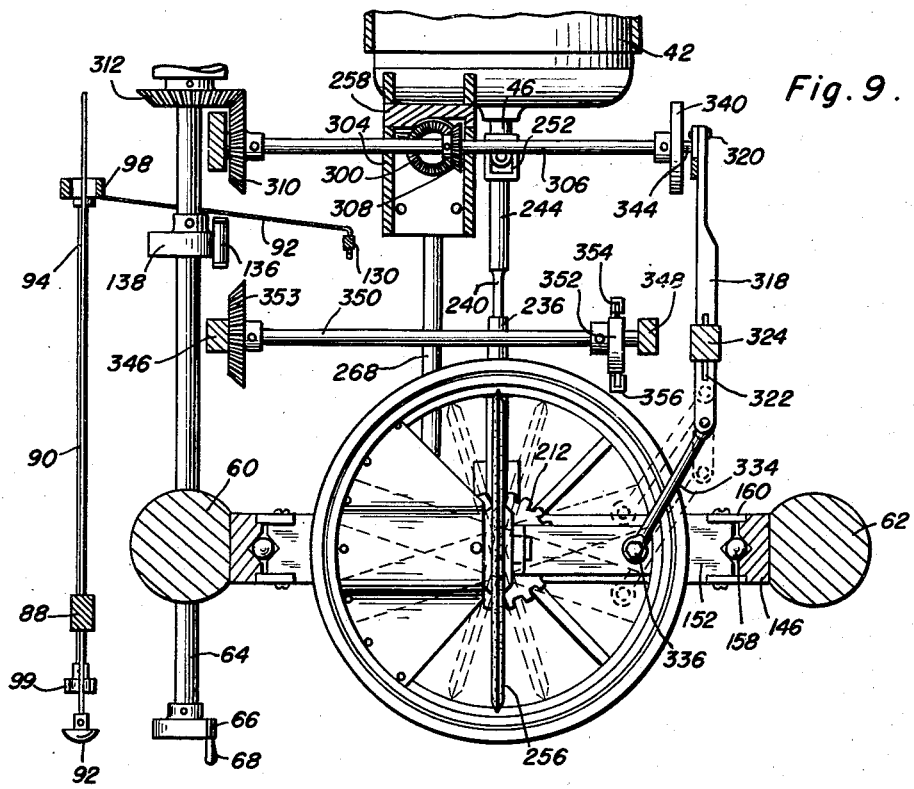
Figure 9 is a fragmentary, horizontal, longitudinal sectional view taken substantially on the plane of section line 9—9 of Figure 7.

Removably secured on the shaft 306, is a wheel 340 having a recess that forms a continuous cam surface 342, as best shown in Figure 14, which engages a bearing pin 344 carried by the link 316, see Figures 6 and 9.

As the shaft 306 rotates, the pin 344 engages and follows the contour of the cam surface 342 reciprocating the link 318 and pushing the link 334 which will impart an oscillatory motion to the casing 164 upon a reciprocation of the casing to bevel on opposite sides of the teeth of saw.

Saw set mechanism

Rotatably supported by a pair of bearings 346 and 348 is a longitudinal shaft 350 on which there is fixed a cam 352, and a beveled gear 353 that engages a beveled gear 355 mounted on the shaft 64.

Figure 3:
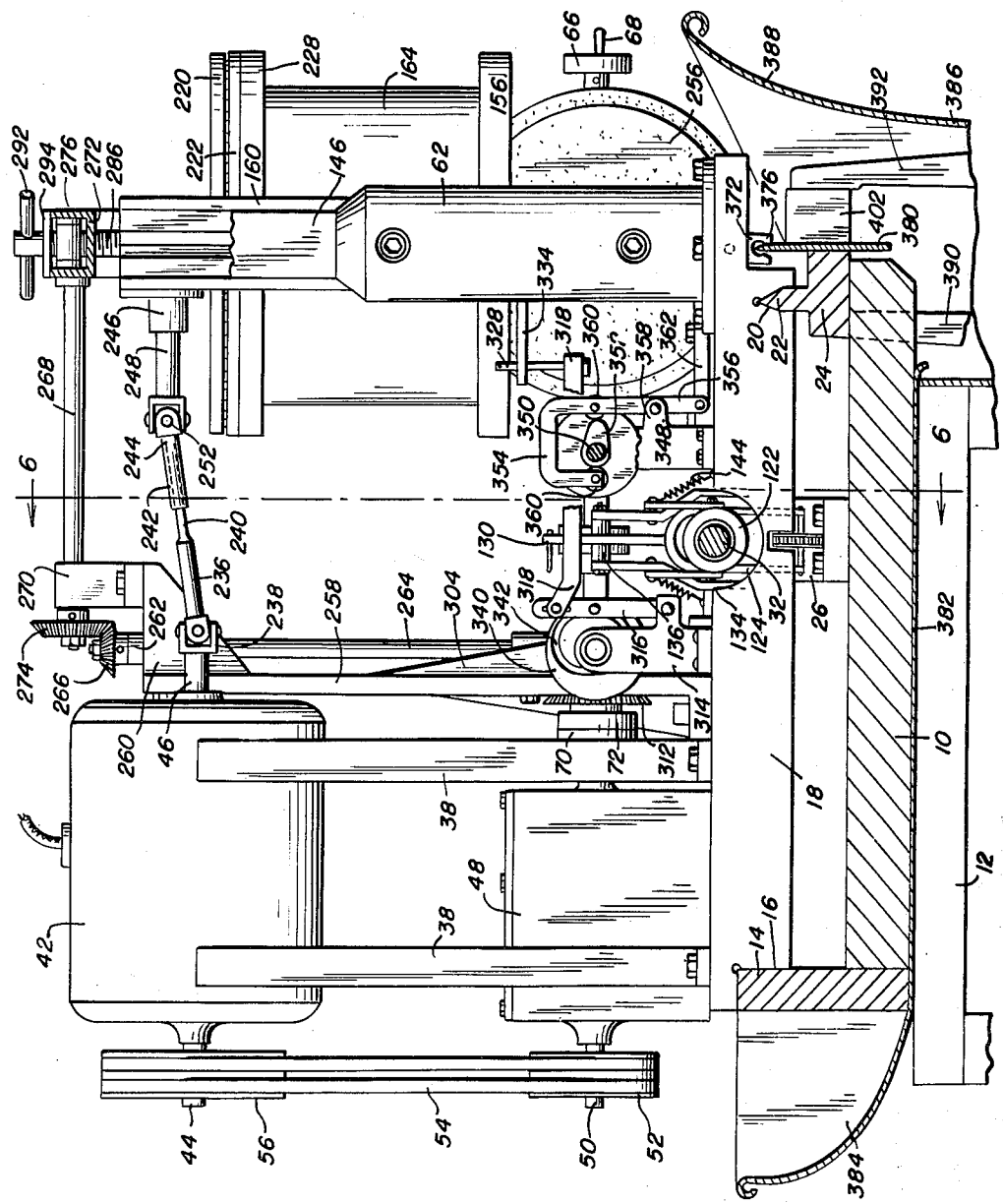
Figure 3 is an enlarged fragmentary, transverse vertical sectional view taken substantially on the plane of section line 3—3 of Figure 1.

Embracing the cam 352, is a substantially U-shaped channel member 354 having an elongated leg portion 356 that is pivoted to spaced ears 358 that project outwardly from the bearing 348. Opposed rollers 360 are supported by the legs of the member 354 for engagement by the apex or lobe of the cam 352 and the end thereof opposite said apex and thus oscillating the member 354 in a smooth uniform arc, see Figures 3, 7 and 15.

Figure 16:
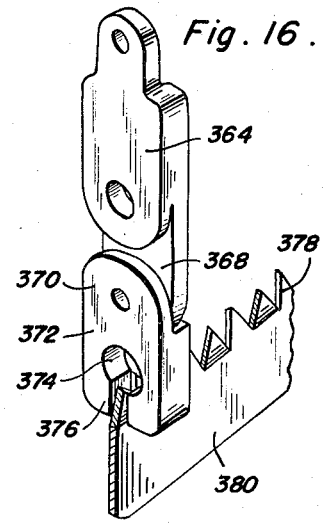

The lower terminal of the leg portion 356 of the member 354 is pivoted to a pitman 362 that supports a pivoted member 364 which is pivoted to the carriage 18 as at 366. The lower reduced and flat end 368 of the member 364 is pivoted to the reduced upper end 370 of a saw tooth bending or setting member 372 having a key slot 374 in its lower end that includes complementary gripping jaws 376, see Figure 16.

As the member 354 is oscillated, the pitman 362 is reciprocated and the member 372 is oscillated or pivoted to bend or twist the teeth 378 of a saw blade 380 a predetermined distance, thus setting the teeth of the saw blade 380.

Fixed to the lower surface of the base plate 10, is a bendable sheet of preferably metallic material 382 the rear longitudinal edge of which is turned upwardly to provide an arcuate trough that is spaced from the rear longitudinal edge of the base plate 10.

Depending from the forward portion of the stand 12, is an elongated, channel shaped trough 386 that is provided with a drain 387. The outer forward portion 388 of the trough 386 is flared outwardly to receive a suitable solution for cooling the saw blade during the sharpening thereof.

In order to retain the saw relative to the base plate 10, and stationary thereto, there is provided a pair of pivotally connected clamping jaws 390 and 392 that are disposed within the forward trough 386. A connecting bolt 394 is pivoted to the jaw 390, extends through aperture provided in the jaw 392 and the forward wall of the trough 386; and is externally threaded to receivably engage a lock nut 396.

A coil spring 398 embraces the bolt and is biased between the said jaws to normally retain the same spread relative to each other.

Figure 2:
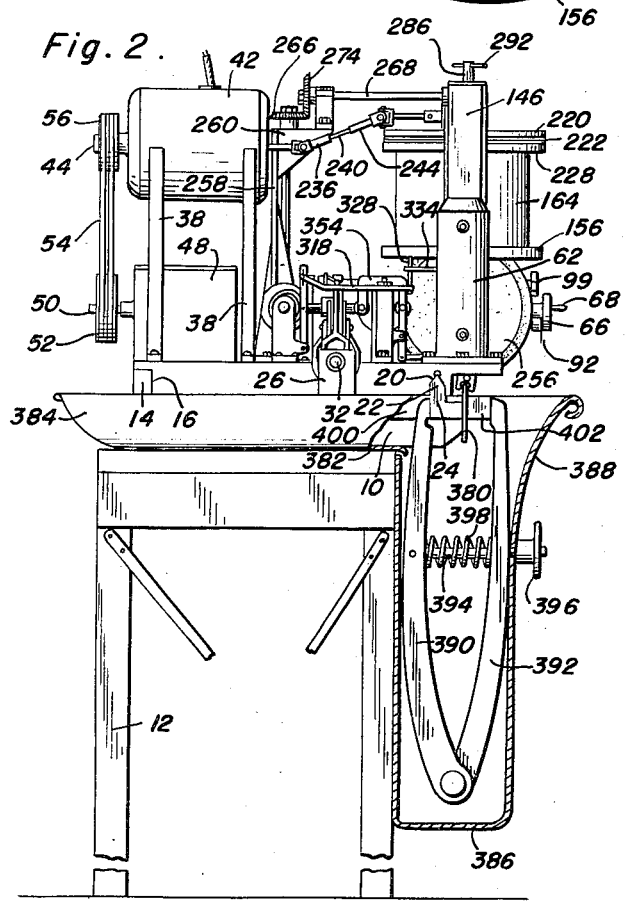
Figure 2 is an end view of the present invention taken substantially in the direction of arrows numbered 2 in Figure 1, and with parts of the forward trough broken away and shown in section for the convenience of explanation.

The free end of the jaw 390 extends through an opening 400 in the base 10 and bears against the guide 24, and the jaw 392 supports a block 402 that bears against the saw 380 to clamp the said saw between the block 402 and the outer faces of the guide 24 and base plate 10, see Figures 2 and 7.

In practical use of the present invention, the saw 380 is clamped by the jaws 390 and 392 to the base plate 10 and the carriage 18 is moved to the left, as shown in Figure 1.

The motor 42 is energized to effect a rotation of the main drive shaft 64 and the carriage will be advanced in a step by step movement on the rack bar 32, as previously described.

Simultaneous with the advancement of the carriage 18, the shaft 248 will be rotated to engage the cam 280 and impart a reciprocating movement to the tool support causing the same to rise over each successive tooth of the saw as the carriage is advanced.

When the wheel or tool 256, is in its uppermost position, during the reciprocation thereof, the carriage is moved on the rack bar and the wheel is in position to engage the next saw tooth.

During the above operation, the wheel 256 is oscillated approximately 15° from the saw by action of the cam 340, the cam action continues, and the wheel 256 is lowered to bevel a further tooth.

The wheel 256 then rises again and reverses oscillation to opposite side of saw and continues on along the saw fully automatic to sharpen the bevel on opposite sides of the teeth of the saw.

When a predetermined number of teeth have been ground or sharpened, the saw setting mechanism will be actuated by cam 352, synchronized with the oscillating and reciprocating motion of the wheel 256 setting the saw teeth as previously described.

Obviously, the present invention is applicable for cutting new teeth on blanks as well as re-sharpening saws such as cross-cut, rip and mitre box saws.

A suitable dressing mechanism 404 is applied to the base plate 10 and will function in the usual manner for dressing the object worked by the present machine structure. (See Figure 1.)

In order to move the carriage 18 manually, there is provided a pair of yokes or brackets 406 and 408, that are suitably secured to the angle members 26, as best shown in Figure 6 of the drawings. Sprockets 410 and 412 are journaled for rotation between the legs of the yokes 406 and 408 and a link chain 414 is trained over the sprockets 410 and 412.

A link chain 416 is anchored at one end to the upper flight of the chain 414, is trained over a sprocket 418 rotatably supported on a bracket 420 depending from the carriage 18, and the free end of the chain 416 is suitably fixed to the lower portion of the yoke 124, see Figure 10.

A shaft 422 is secured in any suitable manner to the sprocket 412 for rotating the sprocket 412 and hence the chain 414 in either direction, to pull the chain 416 downwardly and release the sleeve 100 from the rack bar 32 (see Figure 10). A hand grip 424 is journalled for rotation on the shaft 422 and includes a plurality of circumferentially spaced lugs 426 that are adapted to be received in recesses 428 in a collar 430 fixed on the shaft when the said grip 424 is employed for rotating the chain 416 and moving the carriage manually (see Figure 1).

Having described the invention, what is claimed as new, is:

1. In a saw sharpening machine, a longitudinally movable carriage, means for advancing said carriage in a step-by-step movement, a reciprocating and oscillating member supported on said carriage, means reciprocating said member, means oscillating said member, a rotary tool movable with said member, and means supporting an article of work in a stationary position on said machine to be engaged by said tool, wherein said means for advancing said carriage in a step by step movement including a longitudinally disposed annularly toothed stationary bar, an expansible sleeve embracing said bar and having internal teeth engageable with the teeth on said bar, a cam actuated lever pivoted to the carriage for moving said sleeve in a step by step movement on said bar, means normally retaining said sleeve contracted, and manually actuated means for expanding said sleeve to release the internal teeth thereof with the teeth of said bar.

2. In a saw sharpening machine, a longitudinally movable carriage, means for advancing said carriage in a step-by-step movement, a reciprocating and oscillating member supported on said carriage, means reciprocating said member, means oscillating said member, a rotary tool movable with said member, and means supporting an article of work in a stationary position on said machine to be engaged by said tool, said means for advancing said carriage in a step by step movement including a longitudinally disposed annularly toothed stationary bar, an expansible sleeve embracing said bar and having internal teeth engageable with the teeth on said bar, a cam actuated lever pivoted to the carriage for moving said sleeve in a step by step movement on said bar, means normally retaining said sleeve in a yieldingly contracted position, and a collar loosely embracing said bar and having a tapered end received in one end of said sleeve for expanding the same.

3. The combination of claim 2 and manually actuated means for moving the tapered end of said collar into and out of spreading engagement with said sleeve.

4. In a saw sharpening machine, a longitudinally movable carriage, guides slidably supporting said carriage, a longitudinally disposed, stationary bar having longitudinally spaced, annular teeth, an expansible sleeve embracing said bar, said sleeve having internal teeth engaging the teeth of said bar, means for expanding said sleeve to release the internal teeth thereof with the teeth of said bar, a driving member, a pivotal member carried by said carriage, resilient means acting on said pivotal member to normally urge the latter in a raised position, means connecting said pivotal member to said sleeve, a cam carried by said driving member engaging said pivotal member to actuate the latter against action of said resilient means for moving said sleeve in a step by step movement on said bar, an oscillating and reciprocating support movable with said carriage, means operated by said driving member for oscillating said support, further means operated by said driving member for reciprocating said support, a tool carried by said support and movable therewith, and stationary means supporting a saw relative to said tool, said tool oppositely bevelling adjacent teeth of a saw upon reciprocation of said support.

5. The combination of claim 4 wherein said means operated by said driving member for reciprocating said support includes a driven shaft, a wheel carried by said driven shaft, a reciprocating element actuated by said wheel, and means connecting said reciprocating element to said support.

6. The combination of claim 5 wherein said wheel includes a recessed cam surface, and a pin carried by said reciprocating element bearing against said cam surface.

7. The combination of claim 4 wherein said further means operated by said driving member for reciprocating said support includes a driven member, a further cam mounted on said driven member, and a pivotal element supported relatively to said carriage, said pivotal element being engaged with said support, said further cam engaging said pivotal element to actuate the latter for reciprocating said support.

8. The combination of claim 4 and a saw setting mechanism movable with said carriage, said mechanism including a reciprocating saw tooth engaging member for alternately and oppositely setting the teeth of a saw during longitudinal movement of said carriage.

9. The combination of claim 4 and a saw setting mechanism movable with said carriage, said saw setting mechanism including a substantially U-shaped member having an elongated leg portion, means pivotally securing the elongated leg portion of said U-shaped member to said carriage, rollers carried by the leg portions of said U-shaped member, a rotary cam engaging said rollers for imparting a swinging movement to said U-shaped member, a saw tooth engaging member for alternately and oppositely setting the teeth of a saw during longitudinal movement of said carriage, and means connecting said tooth engaging member to said U-shaped member for pivotally actuating the former during the swinging movement of said U-shaped member.

10. In a saw sharpening machine, a longitudinally movable carriage, guides slidably supporting said carriage, a longitudinally disposed, stationary bar having longitudinally spaced, annular teeth, an expansible sleeve embracing said bar, said sleeve having internal teeth engaging the teeth of said bar, means for expanding said sleeve to release the internal teeth thereof with the teeth of said bar, a driving member, a pivotal member carried by said carriage, resilient means acting on said pivotal member to normally urge the latter in a raised position, means connecting said pivotal member to said sleeve, a cam carried by said driving member engaging said pivotal member to actuate the latter against action by said resilient means for moving said sleeve in a step by step movement on said bar, an oscillating and reciprocating support movable with said carriage, means operated by said driving member for oscillating said support, further means operated by said driving member for reciprocating said support, a tool carried by said support and movable therewith, means for supporting a saw relatively to said tool, said tool oppositely bevelling a saw tooth upon a complete reciprocation of said support, and means for consecutively and oppositely setting the teeth of a saw upon longitudinal, step by step movement of said carriage.

11. In a saw sharpening machine including a carriage and an oscillating and reciprocating tool holder mounted on the carriage, an elongated annularly toothed stationary bar, an expansible sleeve embracing said bar and having internal teeth engageable with the teeth on said bar, a vertically swingable member mounted on said carriage for raising and lowering movement and connected to said sleeve for moving the sleeve upon the bar during raising of said member, means connected to said member and yieldingly urging the member to a raised position, a rotary cam on said carriage and riding against said member to lower the member, and manually actuated means for expanding said sleeve to permit unrestricted movement of said sleeve upon said bar.

12. In a saw sharpening machine including a carriage and an oscillating and reciprocating tool holder mounted on the carriage, an elongated annularly toothed stationary bar, an expansible sleeve embracing said bar and having internal teeth engageable with the teeth on said bar, a vertically swingable member mounted on said carriage for raising and lowering movement and connected to said sleeve for moving the sleeve upon the bar during raising of said member, means connected to said member and yieldingly urging the member to a raised position, a rotary cam on said carriage and riding against said member to lower the member, a collar swingably mounted on said carriage and having a tapered end adapted to enter said sleeve to expand said sleeve, means connected to said collar for moving the tapered end of said collar into said sleeve, and means for retaining the tapered end of said collar within said sleeve and for also moving the carriage when the sleeve is expanded by the tapered end of said collar.

13. In a saw sharpening machine including a carriage and an oscillating and reciprocating tool holder mounted on the carriage, an elongated annularly toothed stationary bar, an expansible sleeve embracing said bar and having internal teeth engageable with the teeth on said bar, a vertically swingable member mounted on said carriage for raising and lowering movement and connected to said sleeve for moving the sleeve upon the bar during raising of said member, means connected to said member and yieldingly urging the member to a raised position, a rotary cam on said carriage and riding against said member to lower the member, a collar swingably mounted on said carriage and having a tapered end adapted to enter said sleeve to expand said sleeve, means connected to said collar for moving the tapered end of said collar into said sleeve, an endless drive chain on the machine, a connecting chain between said drive chain and said means connected to said collar for retaining the tapered end of said collar in said sleeve, and means for moving the drive chain to move the carriage.

14. In a saw sharpening machine including a frame, a carriage movable upon the frame, and a reciprocating and oscillating tool holder mounted on the carriage, an elongated annularly toothed bar mounted on the frame, said carriage having an elongated channel receiving said bar, an expansible sleeve embracing the bar and having internal teeth engageable with the teeth on said bar, a vertically swingable member carried by the carriage and connected to said sleeve for moving the sleeve in a step-by-step manner on the bar, resilient means yieldingly urging the member to a raised position, a rotary cam riding against said member to lower said member whereupon the resilient means will return the member to its raised position and move the sleeve upon the bar, a collar surrounding the bar and having a tapered end for entering the sleeve to expand the sleeve and permit unrestricted sliding movement of the sleeve upon the bar, and a manually actuated drive chain carried by the frame, underlying the carriage and connected to said collar for retaining the tapered end of the collar within the sleeve and for moving the carriage upon the frame as the tapered end of the collar is held in the sleeve.

15. In a saw sharpening machine including a pair of posts, a tool holder slidably and rotatably mounted on and between said posts, a cross-member joining the upper ends of said posts, a vertically swingable arm pivoted to said cross-member and having a curved end portion, a rotary cam mounted on said cross-member and riding against said curved end portion to swing said arm, a swivel connection between said arm and said holder for raising and lowering said holder during raising and lowering of said arm, and means for oscillating said holder during raising and lowering of said holder.

16. In a saw sharpening machine including a pair of posts, a tool holder slidably and rotatably mounted on and between said posts, a cross-member joining the upper ends of said posts, a vertically swingable arm pivoted to said cross-member and having a curved end portion, a rotary cam mounted on said cross-member and riding against said curved end portion to swing said arm, a swivel connection between said arm and said holder for raising and lowering said holder during raising and lowering of said arm, a carriage slidably mounted on said frame, an oscillating and reciprocating tool holder carried by and movable with said frame, an externally toothed bar held stationary on said frame, an internally toothed expansible sleeve surrounding said bar, a member swingably mounted on said carriage and connected to said sleeve for moving the sleeve upon the bar, resilient means connecting said member to said carriage and urging the member to a position for pulling the sleeve upon the bar, a rotary cam riding against said member to urge the member toward the sleeve, a manually operated means on the carriage for expanding the sleeve to permit unrestricted sliding movement of the sleeve upon the bar, a means for retaining the manually operated means engaged with said sleeve and the sleeve expanded and for also moving the carriage when the sleeve is held expanded, and an oscillating saw setting mechanism supported solely by said carriage.

ARTHUR J. BOUTIN.

REFERENCES CITED

The following references are of record in the file of this patent:

UNITED STATES PATENTS

| Number | Name | Date |
|---|---|---|
| 574,855 | Schofield | Jan. 5, 1897 |
| 1,179,752 | Pangburn | Apr. 18, 1916 |
| 1,480,172 | Majewicz | Jan. 8, 1924 |
| 1,846,331 | Hickey | Feb. 23, 1932 |

FOREIGN PATENTS

| Number | Country | Date |
|---|---|---|
| 2,619 | Great Britain | 1909 |